(12) United States Patent
Melnychuk et al.

(10) Patent No.: US 7,570,741 B2
(45) Date of Patent: Aug. 4, 2009

(54) DIAMOND BASED PROTON BEAM TARGET FOR USE IN CONTRABAND DETECTION SYSTEMS

(75) Inventors: Stephan T. Melnychuk, Carlsbad, CA (US); Raymond J. Meilunas, Lexington Park, MD (US)

(73) Assignee: Contraband Detection Systems, L.L.C., East Hampton, NY (US)

( * ) Notice: Subject to any disclaimer, the term of this patent is extended or adjusted under 35 U.S.C. 154(b) by 167 days.

(21) Appl. No.: 10/567,026

(22) PCT Filed: Aug. 6, 2004

(86) PCT No.: PCT/US2004/025447

§ 371 (c)(1), (2), (4) Date: Jan. 10, 2007

(87) PCT Pub. No.: WO2005/029032

PCT Pub. Date: Mar. 31, 2005

(65) Prior Publication Data

US 2007/0172030 A1 Jul. 26, 2007

(51) Int. Cl.
*H01J 35/08* (2006.01)
*G01N 23/04* (2006.01)
(52) U.S. Cl. .................... 378/143; 378/57
(58) Field of Classification Search .......... 378/57, 378/62, 119, 120, 143, 144; 376/157; 250/398
See application file for complete search history.

(56) References Cited

U.S. PATENT DOCUMENTS

| | | | |
|---|---|---|---|
| 3,426,420 A | 2/1969 | Grant et al. | |
| 4,266,138 A | 5/1981 | Nelson, Jr. et al. | |
| 4,431,709 A | 2/1984 | Bronnes et al. | |
| 4,864,142 A | 9/1989 | Gomberg | |
| 5,040,200 A | 8/1991 | Ettinger et al. | |
| 5,124,554 A | 6/1992 | Fowler et al. | |
| 5,278,418 A | 1/1994 | Broadhurst | |
| 5,323,004 A | 6/1994 | Ettinger et al. | |
| 5,338,934 A | 8/1994 | Morohashi et al. | |
| 5,461,657 A | 10/1995 | Hayashida et al. | |
| 5,740,228 A | 4/1998 | Schmidt et al. | |
| 5,784,430 A | 7/1998 | Sredniawski | |
| 5,814,821 A | 9/1998 | Reusch et al. | |
| 5,825,848 A | 10/1998 | Virshup et al. | |
| 5,917,874 A | 6/1999 | Schlyer et al. | |
| 6,215,851 B1 | 4/2001 | Meilunas et al. | |

OTHER PUBLICATIONS

Bauer, C., et al., *Nuclear Instruments and Methods in Physics Research A*. 367 (1995) 207-211: "Radiation hardness studies of SVD diamond detectors".

Hassard, J., et al., *Nuclear Instruments and Methods in Physics Research A*. 416 (1998) 539-542: "CVD diamond film for neutron counting".

*Primary Examiner*—Irakli Kiknadze
(74) *Attorney, Agent, or Firm*—Scully, Scott, Murphy & Presser, P.C.

(57) ABSTRACT

Diamond based proton beam target (12) designs for use in contraband detection/indentification systems. Such novel Diamond based proton beam targets (12) are used in Electrostatic and RF Accelerator based devices for generating proton beams (10) that impinge on the targets (12) for generating single or multiple monoenergetic gamma ray (15) beams used in detection/measurement of contraband.

12 Claims, 3 Drawing Sheets

Schematic of Proton Beam Target : New Design for Electrostatic Accelerator Based CDS

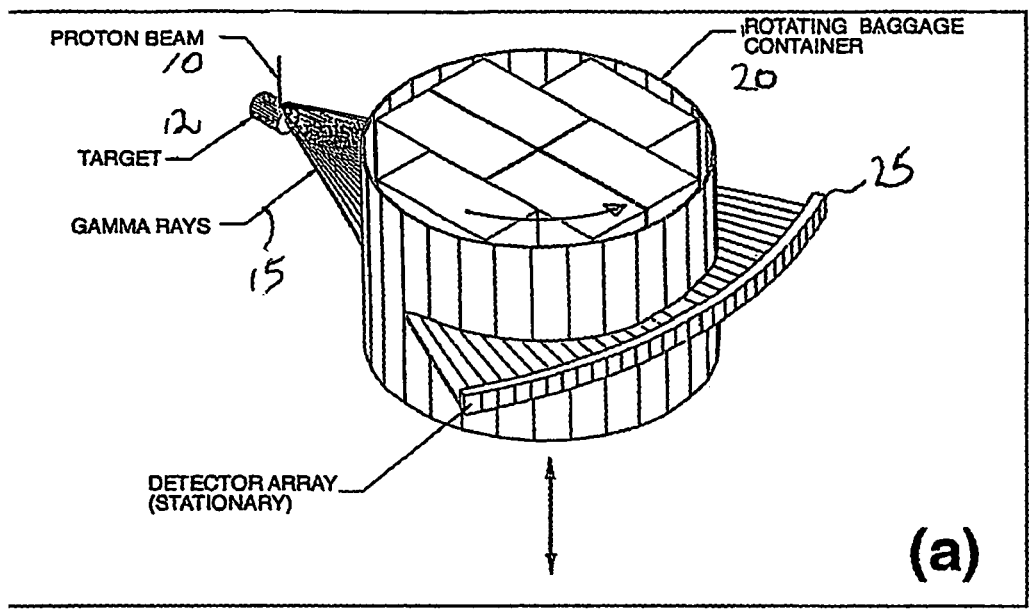
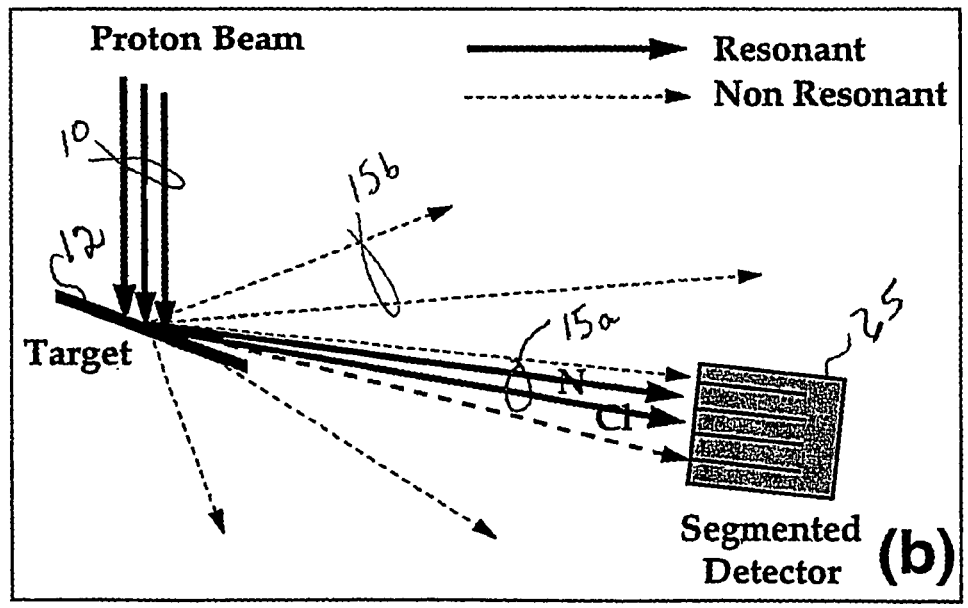
Figure 1. Schematic of (a) contraband detection system and (b) gamma beam geometry

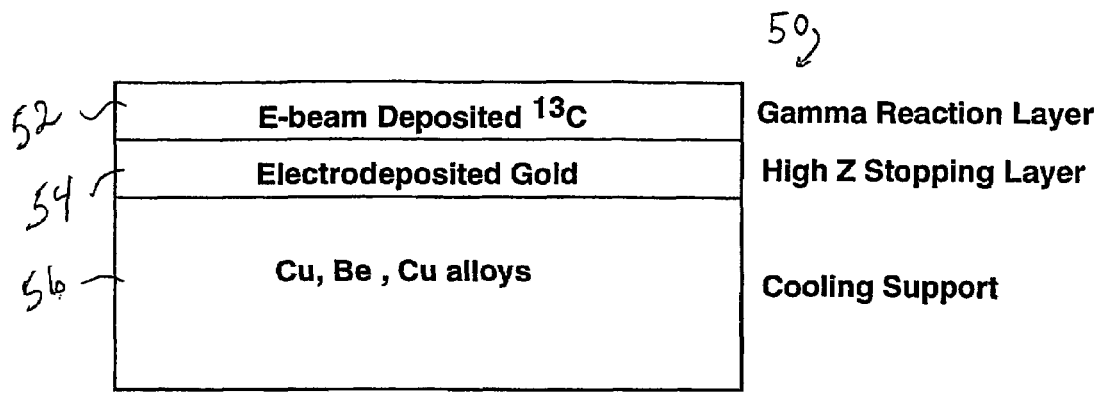
Figure 2. Schematic of Proton Beam Target: Prior Art
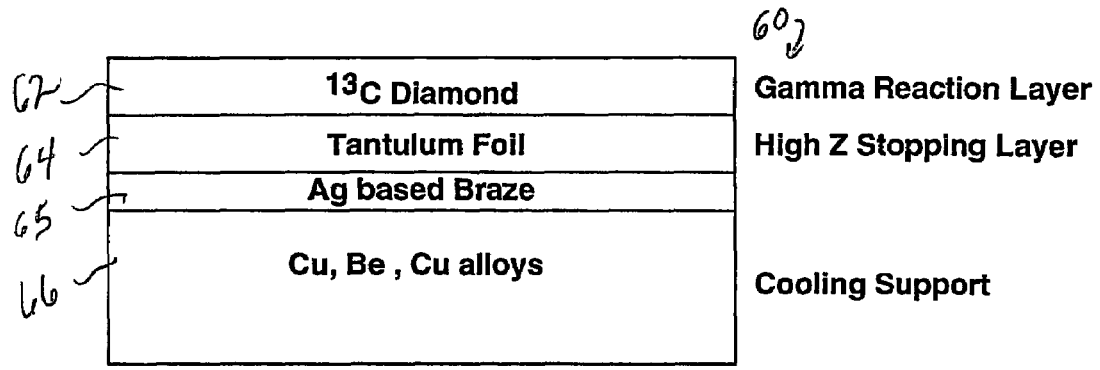
Figure 3. Schematic of Proton Beam Target : New Design for Electrostatic Accelerator Based CDS

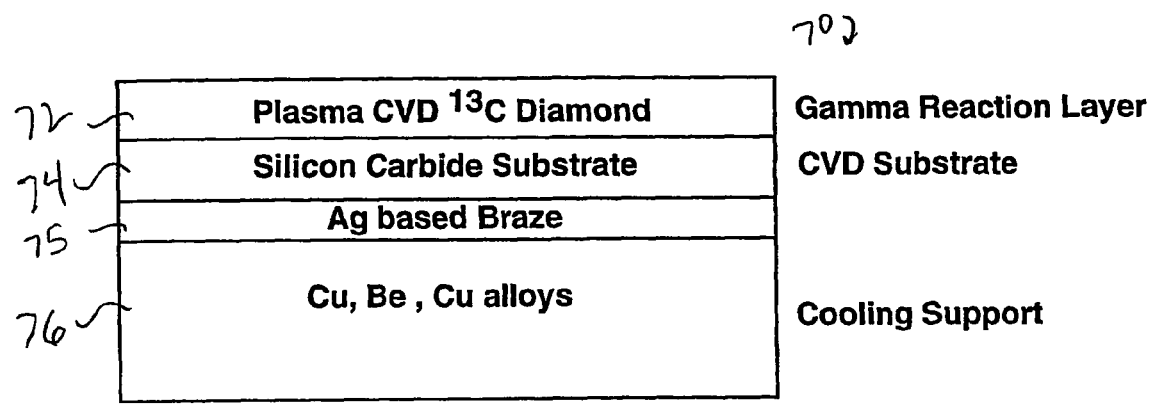
Figure 4. Schematic of Proton Beam Target : New Design for RF Accelerator Based CDS

DIAMOND BASED PROTON BEAM TARGET FOR USE IN CONTRABAND DETECTION SYSTEMS

BACKGROUND OF THE INVENTION

1. Field of the Invention

The present invention relates to proton beam targets used in contraband detection systems and other applications including medical imaging, and particularly to more durable proton beam target designs and methods of their manufacture.

2. Description of the Prior Art

Systems for detecting nitrogen based elements in contraband materials are fairly well known. These systems basically utilize the irradiation of such materials with gamma rays and the detection of gamma rays emitted or absorbed by the materials after subjecting them to the input gamma rays of specific energy to be preferentially absorbed or to induce fluorescence in the specific elemental material being detected. One technique of such detection is Gamma Resonance Absorption (GRA) analysis. This type of system generally utilizes the effect of gamma ray absorption by the nucleus of the objects being interrogated during irradiation. The concentration of these gamma rays are detected by gamma ray detectors or arrays of detectors and the signals analyzed to determine the concentrations of chemical elements which make up the object being interrogated. These elements are found in explosives or illicit drugs in differing quantities, ratios and concentrations. By calculating and determining the ratios and concentrations, it is possible to identify and differentiate targeted contraband substances.

In such Contraband Detection Systems (CD or CDS), an example of which is shown in FIG. 1(a), a proton beam 10 is generated that is directed to a proton beam target device 12 that generates a gamma ray fan 15 that is directed to a target object 20 such as a rotating baggage container. Such a GRA CDS system is described in U.S. Pat. No. 5,784,430 the whole contents and disclosure of which is incorporated by reference as if fully set forth herein. Such CD systems are distinguishable by the manner in which the proton beam is generated: 1) Electrostatic Accelerator based, and 2) RF Accelerator based. An early form of the Electrostatic Accelerator based CDS comprises a high current (e.g., 10 mA) electrostatic accelerator, a specially designed proton beam target 12 for gamma generation, and a detector such as segmented and arrayed Bismuth Germinate (BGO) detectors 25. The accelerator produces a beam of protons 10, e.g., at energies of about 1.75 MeV, with a very narrow energy spread. As shown in FIG. 1(b), this high energy proton beam is bombarded onto the specially designed target 12 which is coated with a thin film of $^{13}$C (of about 1 micron thick) to generate resonant gamma rays 15a at an energy of about 9.17 MeV by the reaction $^{13}$C(p,γ)$^{14}$N and, additionally, generates non-resonant gamma emissions 15b. The resultant gamma rays 15a are preferentially absorbed by $^{14}$N in explosives-type contraband. The penetrating power of the gamma rays combined with a tomographic detection scheme allows 3-D images of the total density and select element density in the interrogated cargo/luggage/container to be generated which is then utilized to detect for the presence of concealed explosives utilizing the ratio of resonant to non-resonant absorption thereby providing the ratio of Nitrogen density to total density.

With more particularity, as shown in FIG. 2, one prior art configuration for the Electrostatic Accelerator based CDS proton beam target 50 used in a GRA system, such as described in issued U.S. Pat. No. 6,215,851, the contents and disclosure of which is incorporated by reference herein, consists of a thin film 52 of $^{13}$C deposited onto a substrate comprising a layer 54 of suitable high atomic number (Z) material. The high Z material serves as a stopping layer for the energetic protons after they have traversed through the $^{13}$C layer 52. The stopping layer must be composed of a material that will not react with the high energy proton beam to produce additional gamma signals which will interfere with the desired $^{13}$C resonant gamma emission. The prior art target device 50 has utilized electroplated gold (Au) as the stopping layer 54. The high Z layer also needs to be of a minimal thickness (roughly 20 microns for Au) necessary to fully stop the proton beam without substantially attenuating the gamma signal generated by the $^{13}$C layer. This thickness requirement for the stopping layer necessitates its application onto a low Z, high thermal conductivity, cooling support 56 typically fabricated from Cu or Be to allow for adequate heat dissipation from the proton implant zone. Historically, an amorphous $^{13}$C layer 52 is deposited onto the Au stopping layer by an e-beam evaporation technique utilizing amorphous $^{13}$C powder as a source.

The need for fast inspection time in a new system gives rise to proton beam currents of 10 mA or higher impinging onto the target. Proton beam targets fabricated in this prior art configuration are not able to withstand such high current bombardment. After limited proton exposures the targets show evidence of film blistering and $^{13}$C coating delamination.

With respect to the RF Accelerator based CDS, these systems typically comprise an RF accelerator based proton beam generator unit, and may incorporate energy discriminating, nitrogenous liquid scintillators (replacing the Bismuth Germinate (BGO) scintillator detectors of the Electrostatic Accelerator based unit) that can distinguish between photoprotons and photoelectrons produced in gamma rays interactions in the detector. This type of detector is described in U.S. Pat. Nos. 5,040,200 and 5,323,004 the whole contents and disclosure of which is incorporated by reference as if fully set forth herein. The advantage of this type of detector is that it does not require very tight control of the proton beam energy spread thus making it practical to utilize a radio frequency accelerator instead of an electrostatic based design for gamma generation. An RF accelerator based unit is desirable as it provides a simpler system design with higher current output and improved overall system reliability at comparable cost to an electrostatic device.

These "second generation" RF Accelerator based systems also utilize 8 MeV gamma rays in addition to the 9.17 MeV resonant gamma rays for normalization, where the 8 MeV gamma rays are produced from proton beam interaction with a much thicker $^{13}$C layer on the target (in excess of fifty (50) microns). This detection scheme and thicker proton beam target contributes to improved contrast in the generated tomographic images. This allows for much better detection of explosives and contraband disguised in sheet form, aunique advantage of the GRA based tomographic detection scheme over conventional X-ray based approaches.

With more particularity, the prior art configuration for the RF Accelerator based CDS proton beam target incorporates a roughly 50 micron thick $^{13}$C layer that also must withstand interaction with a high current (e.g., 10 mA) proton beam. In the prior art proton beam target design, a film of amorphous, isotopic $^{13}$C would be deposited onto a substrate comprised of a twenty micron thick gold layer electroplated onto a Cu or Be cooling/structural support (as shown in FIG. 2). The one micron thick isotopic $^{13}$C layer would be deposited onto the target with e-beam evaporation techniques utilizing a solid (powder) source of $^{13}$C. This thin film deposition technique, though, is unsuitable for fabricating 50 micron thick $^{13}$C layers. Thick carbon layers, e.g., layers greater than ten microns thick) can be deposited by high temperature chemical vapor deposition (CVD) methods from gas phase hydrocarbon precursors (propane, methane, etc.) to produce what is commonly referred to as pyrolytic carbon. There are several drawbacks to CVD processes for fabricating proton beam targets. Producing a fifty micron thick or greater pyrolytic carbon layer by thermal CVD is at the limit of the technique's process window. Thicker coatings typically delaminate from substrates as a result of internal stress built-up in the film which scales with film thickness. Pyrolytic carbon deposition by CVD also requires substrate temperatures in excess of 1000-1700° C. that limits the range of suitable materials which can be utilized as support substrates. Thermal expansion mismatch between the pyrolytic carbon layer and most metals (such as the standard copper/gold support substrate previously used in GRA systems) result in film delamination either upon substrate cool down after $^{13}$C layer deposition or during high current, proton beam exposures in the detection system. Utilization of a CVD process to produce $^{13}$C pyrolytic carbon layers are also costly as the isotopic hydrocarbon gas source ($^{13}$CH$_4$) is expensive and the gas to solid conversation in the process is inefficient with a major portion of the source gas exiting the deposition chamber unreacted as exhaust.

With the on-going threat of terrorism all over the world, the need has come for improved means of detecting contraband materials, including nitrogen and nuclear containing explosives that may be concealed in vehicles such as cars, trucks automobiles, shipping containers, airplanes, etc. This requires the implementation of improved proton beam target devices.

SUMMARY OF THE INVENTION

The present invention is directed to a novel $^{13}$C diamond based proton beam target device for CDS systems that is of increased durability and capable of better withstanding impact of high energy proton beams utilized in the generation of gamma rays for such CDS systems.

According to the first aspect of the invention, the novel proton beam target device permits the electrostatic accelerator based contraband detection system to operate at a current level that will permit inspection of suspect containers/cargo/luggage in both an accurate and timely manner. Further, according to the first aspect of the invention, the novel proton beam target device makes the contraband detection system a commercially viable system for various airport and defense/homeland security needs. Further, according to the first aspect of the invention, the novel proton beam target device permits the contraband detection system to operate with new, more practical gamma energy detection schemes utilizing an RF Accelerator or High current Electrostatic accelerator and a variety of detectors including energy discriminating, plastic or liquid scintillator resonant detectors. Further, according to the first aspect of the invention, the novel proton beam target device is easily decontaminated after long term exposure, thus, extending the lifetime of the target. This improved lifetime translates into reduced maintenance costs for the overall system. These combined attributes of the novel proton beam target device according to the first aspect of the invention thus make the contraband detection unit an even more commercially viable system for various airport and defense/homeland security needs.

Advantageously, the diamond based proton beam target may be used in other applications in addition to contraband detection. For instance, medical applications such as whole body composition imaging that enable detection of elements such as nitrogen, oxygen, carbon or calcium in the human body, may benefit from use of the diamond-based proton beam target.

BRIEF DESCRIPTION OF THE DRAWINGS

Further features, aspects and advantages of the apparatus and methods of the present invention will become better understood with regard to the following description, appended claims, and the accompanying drawings where:

FIG. 1(a) illustrates a contraband detection system (CDS) according to one aspect of the invention;

FIG. 1(b) depicts the exemplary gamma beam geometry in the CDS depicted in FIG. 1(a);

FIG. 2 is a schematic of a proton beam target according to the prior art;

FIG. 3 is a schematic of a proton beam target according to a first embodiment of the invention for use in Electrostatic Accelerator Based CDS; and, FIG. 4 is a schematic of a proton beam target according to a second embodiment of the invention for use in RF Accelerator Based CDS.

DETAILED DESCRIPTION OF THE PREFERRED EMBODIMENT

As shown in FIG. 3, a new proton beam target design 60 proposed for electrostatic accelerator based CDS comprises a high Z stopping layer 64 composed of a thin foil of tantalum (or Zirconium, Niobium or Hafnium) brazed to the surface of a cooling support 66 fabricated from a low Z, high thermal conductivity material (Cu, Be, or high purity graphite). A braze alloy 65 is chosen with a liquidus above 800° C. A thin film 62 of $^{13}$C diamond forms a top layer and is deposited by a microwave plasma assisted chemical vapor deposition technique onto the Ta foil 64 surface to complete the GRA target structure. The $^{13}$C diamond layer 62 is deposited from a gas mixture of isotopic $^{13}$CO and hydrogen. The conversion efficiency of gaseous $^{13}$CO into thin film diamond during the microwave plasma CVD process is improved by recirculating unreacted $^{13}$CO from the exhaust of the system back into the deposition chamber for further processing. Utilizing a microwave plasma CVD technique allows the diamond to be deposited at a substrate temperature below the liquidus of the braze (<800° C.).

As shown in FIG. 4, a new proton beam target design 70 proposed for the rf accelerator based CDS comprises a 30 micron thick $^{13}$C diamond layer 72 which is deposited by the microwave plasma assisted chemical vapor deposition technique onto a silicon carbide substrate 74 (note: the detection scheme for the RF based CDS does not require a high Z stopping layer in the target). The microwave plasma CVD process is the same as described for the electrostatic based CDS target 60. Once the $^{13}$C diamond layer 72 is deposited on the SiC substrate 74, the substrate is next bonded to a Cu cooling support structure 76 with a high thermal conductivity braze layer 75 to complete the overall proton beam target design.

The benefit of the new target designs for both the electrostatic and RF based CDS cases include: 1) From a materials design standpoint:

The higher thermal conductivity of $^{13}$C diamond (10-20 W/cmK) compared to amorphous or graphitic $^{13}$C (1-4 W/cmK) films (produced by e-beam or thermal CVD methods) improves the thermal dissipation in the target under proton beam exposures. This contributes to overall enhanced target durability.

The higher density of $^{13}C$ diamond (3.5 gm/cc) compared to amorphous or pyrolytic $^{13}C$ (1.8-2.2 gm/cc) allows a thinner $^{13}C$ film to be used in the proton beam target as the gamma generation efficiency of the nuclear reaction is dependent both on material density and layer thickness. The thinner layer translates into a more durable target as the thermal load on the film can be more quickly dissipated to the water cooled support substrate compared to a thicker coating. A thinner coating also has a lower internal stress level than a thicker layer. Cost savings are also realized in the reduced deposition time associated with depositing a thinner coating.

The inherent chemical inertness and hardness of the $^{13}C$ diamond layer compared to amorphous/graphitic $^{13}C$ would allow the target to be easily decontaminated after continuous proton beam exposures, decreasing the long term maintenance cost of the system. Continuous proton beam bombardment of the $^{13}C$ target during system operation results in the formation of an amorphous $^{13}C$ layer on the target surface. The layer forms as a result of beam induced cracking of gas phase, residual hydrocarbons which are always present in the vacuum system of the detection unit. The $^{12}C$ contamination layer contributes to undesired scattering of the emitted gamma signals which ultimately decreases overall system sensitivity. At a certain contamination level, system performance degrades to the point that either the target must be decontaminated or a new target fabricated and installed. No simple or low cost process has been developed to effectively remove the amorphous $^{12}C$ contamination layer without also potentially removing a portion of the expensive $^{13}C$ amorphous film utilized in the prior art target designs. Utilization of $^{13}C$ diamond in the new target design would allow chemical or plasma etch techniques suitable for removing soft amorphous carbon layers to be utilized for target $^{12}C$ decontamination without degradation of the etch resistant CVD diamond layer. The extreme hardness of diamond compared to the soft, $^{12}C$ amorphous layer would even permit the contamination to be removed by simple mechanical abrasion of the target surface with zero removal of the $^{13}C$ coating.

The additional benefits of the new target design for the electrostatic based CDS over the prior art include:

Ta metal has a higher solubility limit for hydrogen than Au (0% H solubility) which allows a higher dose of protons to be implanted into the Ta stopping layer before target blistering occurs.

The carbide forming nature of Ta contributes to improved adhesion between the Ta stopping layer and the $^{13}C$ diamond film; Au does not form any stable carbides.

The attachment of the Ta stopping layer to the cooling support by a brazing process adds increased durability to the target design over the prior art in that: (1) a stronger bond is achieved between the stopping layer and the cooling support due to alloying effects at the braze/Ta and braze/cooling support interfaces, 2) The braze layer reduces the thermal expansion mismatch and subsequent thermal stress generated between the Ta stopping layer and cooling support by providing a mechanism for stress relaxation (plastic deformation) during initial fabrication. The reduced residual stress level at the cooling support/Ta interface allows the steep temperature gradient across the target face (produced by the proton implant zone) to be sustained without interlayer delamination.

The additional benefits of the new target design for the rf accelerator based CDS over the prior art include:

The high thermal conductivity of the SiC substrate also contributes to quickly dissipating the thermal load generated in the proton interaction zone to the water cooled Cu support. CVD diamond also forms a very secure interface chemical bond with SiC which results in strong adhesion between the film and substrate. These two features translate into further improvement in overall target durability compared to the present art.

The attachment of the SiC substrate to the cooling support by a brazing process adds increased durability to the target design for similar reasons as given above for the target design for the electrostatic based CDS.

The advantages of a $^{13}C$ diamond based design from a target fabrication standpoint include:

Utilization of a microwave plasma CVD technique for fabrication of the rf CDS target allows the $^{13}C$ layer to be deposited at a lower temperature; <800° C. compared to deposition of pyrolytic carbon by conventional CVD techniques (1000-1700° C.). Utilization of isotopic $^{13}CO$ as the carbon source will allow the deposition temperature to be further decreased to 600° C. The lower deposition temperature allows a greater range of high thermal conductivity materials to be utilized as support substrates for the $^{13}C$ diamond layer (Cu, Ta, Be) and also reduces the stress generated between the support and $^{13}C$ layer upon sample cool down.

Depositing the $^{13}C$ diamond layer by plasma CVD method (with gas recirculation) reduces the cost of the RF based CDS target fabrication process as $^{13}CO$, the cheapest source of isotopic $^{13}C$, can now be utilized for diamond growth. Thermal CVD methods can not deposit pyrolytic carbon layers from a CO gas source. $^{13}CO$ is the cheapest isotopic $^{13}C$ containing gas as it is the source material of all other vendor supplied isotopic $^{13}C$ materials ($^{13}CH_4$, $^{13}C$ amorphous powder). The manufacture of $^{13}C$ products begins with extraction of naturally occurring $^{13}CO/^{13}CO_2$ from the atmosphere. Each additional chemical manufacturing step (to produce $^{13}CH_4$, $^{13}C_2H_2$ etc.) from the initial $^{13}CO/^{12}CO$ separation process contributes to the additional cost of these other $^{13}C$ source materials.

Utilization of the microwave plasma CVD technique for fabrication of the electrostatic based CDS target also simplifies target fabrication by removing the previously complicated $^{13}C$ layer deposition step. In the prior art electrostatic CDS target design the $^{13}C$ layer would be deposited by e-beam evaporation from an expensive amorphous $^{13}C$ powder source. E-beam evaporation of a carbon powder source (amorphous carbon powder can not be easily sintered into a dense solid) is a tedious and difficult process requiring several weeks of powder preparation and film deposition. This $^{13}C$ film deposition procedure is the most expensive step of the target fabrication process. The $^{13}C$ film deposition process for the electrostatic CDS target can also be simplified by utilizing a magnetron sputtering technique instead of e-beam evaporation which removes the labor intensive powder preparation step. The high cost of the $^{13}C$ sputter target combined with the poor sputter target utilization in the process (less than 20% of the sputter target is actually used to produce a $^{13}C$ film), though, offsets the cost savings realized by eliminating the powder prep.

step. Replacing both of the above $^{13}$C film deposition processes with a plasma CVD based technique decreases both the high cost of the $^{13}$C starting material and the labor intensive powder preparation step. Where previously two weeks would be required to deposit a one micron amorphous $^{13}$C layer by e-beam evaporation, a comparable $^{13}$C diamond layer can be produced by microwave plasma CVD in one hour.

According to the aspect of the invention directed to the improved proton beam target, the electrostatic accelerator based contraband detection system is permitted to operate at a current level that will permit inspection of suspect containers/cargo/luggage in both an accurate and timely manner. The invention thus makes the contraband detection unit a commercially viable system for various airport and defense/homeland security needs.

The invention further allows the contraband detection system to operate with a new, more practical gamma energy detection scheme utilizing an RF Accelerator or High current Electrostatic accelerator and a variety of detectors including energy discriminating, plastic or liquid scintillator resonant detectors. The invention provides a more durable proton beam target design which can be easily decontaminated after long term exposure, thus, extending the lifetime of the target. This improved lifetime translates into reduced maintenance costs for the overall system. These combined attributes of the invention thus make the contraband detection unit an even more commercially viable system for various airport and defense/homeland security needs.

Advantageously, the diamond based proton beam target may be used in other applications in addition to contraband detection. For instance, medical applications such as whole body composition imaging that enable detection of elements such as nitrogen, oxygen, carbon or calcium in the human body, may benefit from use of the diamond-based proton beam target.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A proton beam target for generating gamma rays in response to an impinging proton beam comprising:
   a thin $^{13}$C Diamond gamma reaction layer for generating the gamma rays therefrom; and
   a stopping layer for mitigating transmission of the proton beam therethrough, wherein thermal dissipation in said target under proton beam exposure is improved, wherein the stopping layer comprises a SiC substrate.

2. The proton beam target of claim 1, wherein the thin $^{13}$C Diamond gamma reaction layer is deposited on said stopping layer via a plasma assisted CVD process.

3. The proton beam target of claim 1, wherein the thin $^{13}$C Diamond gamma reaction layer is less than about 30 μm thick.

4. The proton beam target of claim 1, wherein the SiC substrate is brazed to a surface of a cooling support fabricated from a low z, high thermal conductivity material.

5. The proton beam target of claim 4, wherein said cooling support dissipates heat energy away from the stopping layer, said stopping layer being attached to the cooling support and is interposed between the $^{13}$C Diamond gamma reaction layer and the cooling support.

6. A method of fabricating a proton beam target for generating gamma rays which are reflected therefrom in response to an impinging proton beam, the method comprising the steps of:
   (a) forming a stopping layer comprising a SiC substrate for mitigating transmission of the proton beam therethrough; and
   (b) attaching a thin $^{13}$C Diamond gamma reaction layer to the stopping layer for generating the gamma rays therefrom in response to the impinging proton beam, said stopping layer being chemically reactive with the $^{13}$C Diamond.

7. The method of claim 6, wherein the thin $^{13}$C Diamond gamma reaction layer is attached to the stopping layer via a plasma assisted CVD process.

8. The method of claim 6, further comprising the step of:
   (c) attaching the stopping layer onto a cooling support for dissipating heat energy away from the stopping layer.

9. The method of claim 6, wherein the stopping layer is attached to the cooling support via brazing.

10. A contraband detection system comprising:
    a means for producing a high energy beam of protons at a specific energy with a very narrow energy spread;
    a proton beam target for generating gamma rays in response to impinging high energy beam of protons, said resultant gamma rays being preferentially absorbed by a targeted contraband material; and,
    a plurality of detector means for detecting absorption of said gamma rays indicating presence of said targeted contraband material, wherein said proton beam target comprises:
    a thin $^{13}$C Diamond gamma reaction layer for generating the gamma rays therefrom; and
    a stopping layer comprising a SiC substrate for mitigating transmission of the proton beam therethrough, wherein thermal dissipation in said target under proton beam exposure is improved.

11. The contraband detection system of claim 10, wherein the means for producing a high energy beam of protons comprises an RF accelerator.

12. The contraband detection system of claim 10, wherein the detector means for detecting absorption of said gamma rays comprises nitrogenous liquid scintillator detectors.

* * * * *